United States Patent
Kim et al.

(10) Patent No.: US 9,937,696 B2
(45) Date of Patent: Apr. 10, 2018

(54) MANUFACTURING METHOD OF HIGH TEMPERATURE RESISTANT SOUND ABSORBING MATERIALS FOR VEHICLE

(71) Applicants: Hyundai Motor Company, Seoul (KR); Kia Motors Corporation, Seoul (KR)

(72) Inventors: Keun Young Kim, Gyeonggi-do (KR); Dong Uk Lee, Gyeonggi-do (KR); Won Jin Seo, Gyeonggi-do (KR); Ki Dong Lee, Gyeonggi-do (KR); Su Nam Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 373 days.

(21) Appl. No.: 13/858,491

(22) Filed: Apr. 8, 2013

(65) Prior Publication Data
US 2014/0124119 A1    May 8, 2014

(30) Foreign Application Priority Data
Nov. 6, 2012 (KR) .................. 10-2012-0124953

(51) Int. Cl.
*B32B 5/06*    (2006.01)
*D04H 1/488*    (2012.01)
(Continued)

(52) U.S. Cl.
CPC .......... *B32B 38/0012* (2013.01); *B32B 5/022* (2013.01); *B32B 5/06* (2013.01);
(Continued)

(58) Field of Classification Search
CPC .... D04H 1/4242; D04H 1/425; D04H 1/4374; D04H 1/46; D04H 1/70; B32B 38/0012; B32B 38/08
(Continued)

(56) References Cited

U.S. PATENT DOCUMENTS 4,780,359 A * 10/1988 Trask et al. ............. 442/224
5,804,007 A * 9/1998 Asano ..................... 156/72
(Continued)

FOREIGN PATENT DOCUMENTS

KR    10-2002-0089277    11/2002
KR    10-2004-0013840    2/2004
(Continued)

*Primary Examiner* — Jeffry H Aftergut
(74) *Attorney, Agent, or Firm* — Mintz Levin Cohn Ferris Glovsky and Popeo, P.C.; Peter F. Corless (57) ABSTRACT

Disclosed herein is a method for manufacturing a high temperature resistant sound absorbing material for vehicles. In particular, the method includes a beating/blending step, a web forming step, a web laminating step, a needle punching step, a first binder soaking step, a first solvent recovering step, a second binder soaking step, a second solvent recovering step, a second binder surface treating step, a second solvent recovering step, and a molding step. Further, the method of the present invention may include a first binder surface treating step, a first surface solvent recovering step, and a molding step after the first solvent recovering step. In addition, the method of the present invention may further include a third binder soaking step, a third solvent recovering step, a third binder surface treating step, a third surface solvent recovering step, and a molding step after a nonwoven fabric is formed in the needle punching step.

18 Claims, 8 Drawing Sheets

(51) Int. Cl.
  *B32B 38/00*  (2006.01)
  *B32B 38/08*  (2006.01)
  *B32B 5/02*  (2006.01)
  *B32B 5/26*  (2006.01)
  *B32B 7/08*  (2006.01)
  *D04H 1/498*  (2012.01)

(52) U.S. Cl.
  CPC .............. *B32B 5/26* (2013.01); *B32B 7/08* (2013.01); *B32B 38/08* (2013.01); *D04H 1/498* (2013.01); *B32B 2260/023* (2013.01); *B32B 2260/046* (2013.01); *B32B 2262/0246* (2013.01); *B32B 2262/0253* (2013.01); *B32B 2262/0269* (2013.01); *B32B 2262/101* (2013.01); *B32B 2262/103* (2013.01); *B32B 2262/105* (2013.01); *B32B 2262/106* (2013.01); *B32B 2305/20* (2013.01); *B32B 2307/102* (2013.01); *B32B 2307/3065* (2013.01); *B32B 2605/00* (2013.01)

(58) Field of Classification Search
  USPC .................................................. 156/62.8, 60
  See application file for complete search history.

(56) References Cited

U.S. PATENT DOCUMENTS

2004/0097155 A1* 5/2004 Olson et al. .................. 442/352
2012/0237754 A1* 9/2012 Kasuga et al. ............. 428/304.4

FOREIGN PATENT DOCUMENTS

| KR | 10-2006-0043576 | 5/2006 |
| KR | 10-0808117 B1 | 2/2008 |
| KR | 10-2011-0128980 | 12/2011 |
| KR | 10-1150820 B1 | 7/2012 |

* cited by examiner

|  | Shape after molding | Shape after 5 days | Shape after thermal damage | Result |
|---|---|---|---|---|
| Example 7 |  |  |  | No change |
| Comparative Example 1 |  | | | Impossible to mold a product |
| Comparative Example 2 |  |  | | Induction of peeling |
| Comparative Example 3 |  |  |  | Induction of GAP and peeling |

FIG. 8

MANUFACTURING METHOD OF HIGH TEMPERATURE RESISTANT SOUND ABSORBING MATERIALS FOR VEHICLE

CROSS-REFERENCE TO RELATED APPLICATION

This application claims under 35 U.S.C. § 119(a) the benefit of Korean Patent Application No. 10-2012-0124953 filed Nov. 6, 2012, the entire contents of which are incorporated herein by reference.

BACKGROUND (a) Technical Field

The present disclosure relates to a method for manufacturing a high temperature resistant sound absorbing material for vehicles, which includes mixing a fiber material having a limiting oxygen index (LOI) of about 25% or higher and a heat resistant temperature of about 200° C. or higher with a thermosetting binder resin having a heat resistant temperature of about 200° C. or higher. The high temperature resistant sound absorbing material may maintain a substantially consistent shape at a high temperature of about 200° C. or higher and complies with flame retardant standards of Underwriters Laboratories (UL) 94V-0Thus, the material may be used as an automobile part to reduce noise generated in an engine and an exhaust system and may improve automotive N.V.H. (noise, vibration and harshness).

(b) Background Art

While a vehicle is in motion, various types of noises are generated. Automobile noise is generally divided into two types depending on a noise source, an engine or an exhaust system. The noises generated from the engine and exhaust system are delivered to the interior of a vehicle. To reduce the noises generated from the engine and exhaust system and delivered to the interior of a vehicle, a sound absorbing material for vehicles has been developed. In particular, insulation dash and a dash isolation pad are used to prevent engine radiated noise from being emitted into the interior of a vehicle, and a tunnel pad and a floor carpet are used to prevent noises generated from the exhaust system and the bottom of a motor vehicle from being emitted into the interior of the vehicle.

Recently developed methods for manufacturing a sound absorbing material include the steps of: inserting a synthetic resin film layer having a thickness of about 40 to 100 μm between pet fiber layers having a thickness of about 20 mm; passing the pet fiber layers into which the synthetic resin film layer is inserted through a preheating chamber; and compressing the pet fiber layers to create a thickness of about 20 mm. In addition, recently developed methods include a method for producing a sound absorbing material, including the steps of; cutting a polyester fiber and an acrylic fiber; beating the polyester fiber and the acrylic fiber to separate the fibers; mixing the fibers with a low melting point polyester fiber and carding; molding; heating to melt the low melting point polyester fiber to make nonwoven fabric form; compressing and cooling; and cutting the fabric to a desired shape. Further, another recently developed method discloses coating at least one of the top and bottom layers of polyester (PET) felt with a mixture fiber including a low melting fiber (LMF).

The recently developed sound absorbing materials however, increase the weight of the material to sufficiently reduce the noises radiated from the engine and exhaust system. However, the effectiveness of sound proofing is insufficient compared to the increased weight of the material. To overcome these limitations, a sound absorbing material must be applied close to the noise source such as an engine or an exhaust system. To accomplish such placement, the sound absorbing material be capable of maintaining a substantially consistent shape under high temperature conditions such as about 200° C. or higher and must exhibit flame retardant properties. Thus, the conventional sound absorbing materials cannot be used for this purpose The above information disclosed in this section is only for enhancement of understanding of the background of the invention and therefore it may contain information that does not form the prior art that is already known in this country to a person of ordinary skill in the art.

SUMMARY

The present invention provides a method for manufacturing a high temperature resistant sound absorbing material for vehicles which may be disposed near an engine and an exhaust system, may maintain a substantially consistent shape even at a high temperature of about 200° C. or higher, and may show high flame retardancy satisfying 94V-0 flame classification.

The method for manufacturing a high temperature resistant sound absorbing material for vehicles includes a beating/blending step, a web forming step, a web laminating step, a needle punching step, a first binder soaking step, a first solvent recovering step, a second binder soaking step, a second solvent recovering step, a binder surface treating step, a third solvent recovering step, and a molding step.

In an exemplary embodiment, the beating/blending step may be performed by beating a fiber material having a limiting oxygen index (LOI) of about 25% or higher, a heat resistant temperature of about 200° C. or higher, about 1 to 10 crimps per centimeter, a diameter of about 1 to 33 μm and a length of about 20 to 100 mm, or by blending one or more fibers having a limiting oxygen index (LOI) of about 25% or higher, a heat resistant temperature of about 200° C. or higher, about 1 to 10 crimps per centimeter, a diameter of about 1 to 33 μm and a length of about 20 to 100 mm.

In another exemplary embodiment, the fiber material may include one or more materials selected from a group consisting of: a m-Aramid fiber, a p-Aramid fiber, poly(phenylene sulfide) (PPS) fiber, an acrylic hydrocarbon (preoxidized PAN) fiber, a polyimide (PI) fiber, a polybenzimidazole (PBI) fiber, a polybenzoxazole (PBO) fiber, a polytetrafluoroethylene (PTFE) fiber, a metal fiber, a carbon fiber, a glass fiber, a basalt fiber, a silica fiber, and a ceramic fiber.

In still another exemplary embodiment, the web forming step may be performed by a carding method, to form webs in the form of thin sheets. In this step, a card having a swift, two workers located in the left and right sides of the swift, respectively, a fancy being rotated at a high speed, and a cylinder may be used. When the beaten/blended fiber material formed in the beating/blending step is subjected to the card, the material is placed on the swift and cylinder and is combed, to form webs in the form of thin sheets.

In yet another exemplary embodiment, the web laminating step forms a laminated web by overlapping the webs on a conveyer belt. To prevent the webs on the conveyer belt from scattering and breaking due to air resistance, this step may be performed at a production rate of about 10 m/min or slower by using a horizontal lapper.

In still yet another exemplary embodiment, the needle punching step forms a nonwoven fabric by interconnecting the laminated webs formed in the web laminating step through a vertical motion of a needle, which may be performed using a punching motion. More specifically, the punching motion may be one or more motions selected from a group consisting of: a single bottom punching motion, a single top punching motion, a double bottom punching motion, and a double top punching motion.

In a further exemplary embodiment, the first binder soaking step and second binder soaking step form a first resin soaked nonwoven fabric and a second resin soaked nonwoven fabric by soaking the nonwoven fabric formed in the needle punching step in a bath in which a flame retardant thermosetting resin binder having a heat resistant temperature of about 200° C. or higher is dispersed in an organic solvent at a concentration of about 5 to 70%, and compressing the fabric with a mangle roller. These steps may be performed using about 20 to 80 parts by weight of the nonwoven fabric and about 20 to 80 parts by weight of the flame retardant thermosetting resin binder.

In another further exemplary embodiment, the first solvent recovering step and second solvent recovering step form a first thermosetting felt and a second thermosetting felt to leave the flame retardant thermosetting resin binder therein by evaporating the organic solvent from the first resin soaked nonwoven fabric and second resin soaked nonwoven fabric formed in the first binder soaking step and second binder soaking step. These steps may be performed by drying the fabric in a dry oven at a temperature of about 70 to 200° C. for about 1 to 10 min.

In still another further exemplary embodiment, the flame retardant thermosetting resin binder may be composed of a epoxy resin, about 1 to 20 wt % of a curing agent based on the weight of epoxy resin, about 1 to 10 wt % of a catalyst based on the weight thereof, and about 1 to 40 wt % of a flame retardant based on the weight thereof.

In yet another further exemplary embodiment, the second binder surface treating step forms a second resin surface treated felt by treating one surface of the second thermosetting felt formed in the second solvent recovering step with an organic solvent in which a thermosetting binder resin is dispersed. This step may be performed using a gravure or a sprayer.

In still yet another further exemplary embodiment, the second solvent recovering step forms a second resin surface treated thermosetting felt by evaporating the organic solvent from the second resin surface treated felt formed in the second binder surface treating step, resulting in leaving the thermosetting binder resin thereon. This step may be performed by drying the fabric in a dry oven at a temperature of about 70 to 200° C. for about 1 to 10 min.

In a still further exemplary embodiment, the thermosetting binder resin may be composed of epoxy resin, about 1 to 20 wt % of a curing agent based on the weight of epoxy resin, and about 1 to 10 wt % of a catalyst based on the weight thereof.

In a yet still further exemplary embodiment, the epoxy resin may be composed of one or more resins selected from a group consisting of: a bisphenol A diglycidyl ether, a bisphenol F diglycidyl ether, a polyoxypropylene diglycidyl ether, a phosphazene diglycidyl ether, a phenol novolac epoxy, an o-cresol novolac epoxy, and a bisphenol A-novolac epoxy.

In yet another further exemplary embodiment, the organic solvent may be composed of one or more solvents selected from a group consisting of a methyl ethyl ketone (MEK), and a dimethyl carbonate (DMC).

In still yet another further exemplary embodiment, the molding step may be performed by adhering one surface of the first thermosetting felt formed in the first solvent recovering step to one surface of the second resin thermosetting felt formed in the second solvent recovering p, and hot compressing the felts at a temperature of about 150 to 230° C. for about 60 to 300 sec under pressure of about 60 to 200 kgf/cm$^2$ In another aspect, the present invention provides a method for manufacturing a high temperature resistant sound absorbing material for vehicles exhibiting increased heat shielding properties and which may protect surrounding plastic and rubber parts when applied to automobile metal parts of about 200° C. or higher. The method further includes a first binder surface treating step, a first surface solvent recovering step, and a molding step after the first solvent recovering step.

In an exemplary embodiment, the first binder surface treating step forms a first resin surface treated felt by treating one surface of the first thermosetting felt formed in the first solvent recovering step with an organic solvent in which a thermosetting binder resin is dispersed. In addition, this process may be performed using a gravure or a sprayer.

In another exemplary embodiment, a first surface solvent recovering step forms a first resin surface treated thermosetting felt by evaporating the organic solvent from the first resin surface treated felt formed in the first binder surface treating step, resulting in the thermosetting binder resin remaining on the surface. This step may be performed by drying the fabric in a dry oven at a temperature of about 70 to 200° C. for about 1 to 10 min. The thermosetting binder resin may be composed of epoxy resin, about 1 to 20 wt % of a curing agent based on the weight of epoxy resin, and about 1 to 10 wt % of a catalyst based on the weight thereof.

In yet another embodiment, the present invention may include a third binder soaking step, a third solvent recovering step, a third binder surface treating step, a third surface solvent recovering step after the nonwoven fabric is formed in the needle punching step. These steps may be performed similarly as described above.

Furthermore, the molding step may be performed by adhering one surface of the first thermosetting felt formed in the first solvent recovering step to one surface of the second resin surface treated thermosetting felt formed in the second solvent recovering step, and adhering the other surface of the first thermosetting felt to one surface of the third resin surface treated thermosetting felt formed in the third surface solvent removing step, and hot compressing the adhered surfaces at a temperature of about 150 to 230° C. for about 60 to 300 sec under pressure of about 60 to 200 kgf/cm$^2$

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

1, 1'1"Fabric material
2, 2'2"Flame retardant thermosetting resin binder
3, 3'3"Thermosetting binder resin
10, 10'11, 11'12, 12'12"Thermosetting felt
100, 200, 200'300, 300'Resin surface treated thermosetting felt It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a""an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

The present invention relates to a method for manufacturing a high temperature resistant sound absorbing material for vehicles. In particular, the manufacturing method of the present invention may include the following steps of: a beating/blending step of beating and blending a fiber material having a limiting oxygen index (LOI) of about 25% or higher and a heat resistant temperature of about 200° C. or higher; a web forming step of forming a plurality of webs in thin sheets using the beaten and blended fiber material; a web laminating step of forming a plurality of laminated webs by overlapping the plurality of webs; a needle punching step of forming a nonwoven fabric by interconnecting the plurality of laminated webs by a vertical motion of a needle; a first treatment phase step; and second treatment phase step; and a molding step.

The first treatment phase step includes: forming a first resin soaked nonwoven fabric by soaking the nonwoven fabric in an organic solvent in which a flame retardant thermosetting resin binder having a heat resistant temperature of about 200° C. or higher is dispersed; and forming a first thermosetting felt, wherein the flame retardant thermosetting resin binder remains in the first resin soaked nonwoven fabric.

In addition, the second treatment phase step includes forming a second resin soaked nonwoven fabric by soaking the nonwoven fabric in the organic solvent in which the flame retardant thermosetting resin binder is dispersed; forming a second thermosetting felt, wherein the flame retardant thermosetting resin hinder remains in the second resin soaked nonwoven fabric; forming a second resin surface treated felt by treating one surface of the second thermosetting felt with the organic solvent in which the thermosetting binder resin is dispersed; forming a second resin surface treated thermosetting felt, wherein the thermosetting binder remains in the second resin surface treated felt.

Moreover, the molding step includes forming a high temperature resistant sound absorbing material by adhering a surface of the first thermosetting felt to a surface of the second resin surface treated thermosetting felt.

In another embodiment of the present invention, the first treatment phase may further include:

forming a first resin surface treated felt by treating a surface of the first thermosetting felt with the organic solvent in which the thermosetting binder resin is dispersed; and forming a first resin surface treated thermosetting felt, wherein the thermosetting binder resin remains in the first resin surface treated felt.

Furthermore, this embodiment may include a molding step of forming a high temperature resistant sound absorbing material by adhering a surface of the first resin surface treated thermosetting felt to a surface of the second resin surface treated thermosetting felt.

In yet another embodiment of the present invention, the method may include a third treatment phase. The third treatment phase may include: forming a third resin soaked nonwoven fabric by soaking the nonwoven fabric in the organic solvent in which the flame retardant thermosetting resin binder is dispersed; forming a third thermosetting felt, wherein the flame retardant thermosetting resin binder remains in the third resin soaked nonwoven fabric; forming a third resin surface treated felt by treating a surface of the third thermosetting felt with the organic solvent in which the thermosetting binder resin is dispersed; and forming a third surface treatment thermosetting felt, wherein the thermosetting binder resin remains in the third resin surface treated felt.

In addition, this embodiment may further include a molding step of forming a high temperature resistant sound absorbing material by adhering a surface of the first resin surface treatment thermosetting felt to a surface of the second resin surface treatment thermosetting felt, and adhering the other surface of the first thermosetting felt to a surface of the third resin surface treatment thermosetting felt.

Hereinafter, the present invention will be described in more detail.

Figure 1:
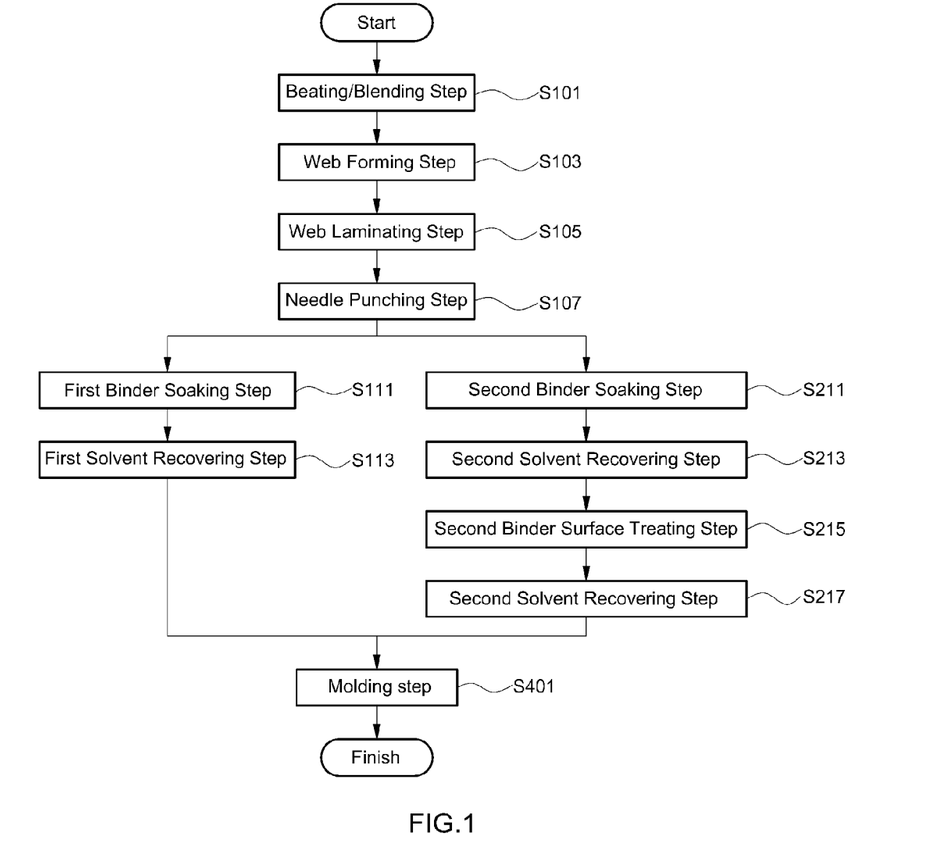
FIGS. 1-3 are exemplary flowcharts showing the manufacturing method of a high temperature resistant sound absorbing material for vehicles according to exemplary embodiments of the present invention.

As shown in FIG. 1, the method for manufacturing a high temperature resistant sound absorbing material for vehicles according to the present invention includes a beating/blending step (S101), a web forming step (S103), a web laminating step (S105), a needle punching step (S107), a first binder soaking step (S111), a first solvent recovering step (S113), a second binder soaking step (S211), a second solvent recovering step (S213), a second binder surface treating step (S215), a second solvent recovering step (S217), and a molding step (S401).

The beating/blending step (S101) includes beating a fiber material having a limiting oxygen index (LOI) of about 25% or higher, a heat resistant temperature of about 200° C. or higher, about 1 to 10 crimps per centimeter, a diameter of about 1 to 33 μm and a length of about 20 to 100 mm, or blending one or ore fibers having a limiting oxygen index (LOT) of about 25% or higher, a heat resistant temperature of about 200° C. or higher, about 1 to 10 crimps per centimeter, a diameter of about 1 to 33 μm and a length of about 20 to 100 mm. In this step, an air-blowing technique may be used to disperse the fibers substantially evenly.

The fiber material may be composed of one or more materials selected from a group consisting of: a m-Aramid fiber, a p-Aramid fiber, a poly(phenylene sulfide) (PPS) fiber, an acrylic hydrocarbon (preoxidized PAN) fiber, a polyimide (PI) fiber, a polybenzimidazole (PBI) fiber, a polybenzoxazole (PBO) fiber, a polytetrafluoroethylene (PTFE) fiber, a metal fiber, a carbon fiber, a glass fiber, a basalt fiber, a silica fiber, and a ceramic fiber. The fiber material may be a base material for a temperature resistant sound absorbing material and may absorb noise radiated from an engine and an exhaust system, to reduce noise within the vehicle.

The web forming step (S 103) may include a carding method to form a plurality of webs in thin sheets. In this step, a card having a swift, two workers located in the left and right sides of the swift, respectively, a fancy rotated at a high speed, and a cylinder may be used. When the beaten/blended fiber material formed in the beating/blending step (S101) is subjected to the card, the fiber material may be disposed on the swift and cylinder and the fiber material may be combed, to form the plurality of webs in thin sheets. This step may provide the formed webs with bulkiness, maximize opening efficiency, and minimize scattering fu molecular weight.

The web laminating step (S105) may include forming a laminated web by overlapping the webs formed in the web forming step (S103) on a conveyer belt. This step may be performed at a production rate of 10 m/min or slower using a horizontal lapper. Furthermore, this process may prevent the plurality of webs on the conveyer belt from scattering and breaking due to air resistance.

The needle punching step (S107) may include forming a nonwoven fabric by interconnecting the laminated webs formed in the web laminating step (S105) using a vertical motion, an inclined direction motion or a bidirectional motion of a needle to the surface of the laminated web. Additionally, the punching motion may be one or more motions selected from the group consisting of: a single bottom punching motion, a single top punching motion, a double bottom punching motion, and a double top punching motion. Furthermore, the part of the laminated webs horizontally arranged may be perpendicularly arranged, to increase the reinforcing solidity of the nonwoven fabric.

The first binder soaking step (S111) and second binder soaking step (S211) may form a first resin soaked nonwoven fabric and a second resin soaked nonwoven fabric by soaking the nonwoven fabric formed in the needle punching step (S107) in a bath in which a flame retardant thermosetting resin binder having a heat resistant temperature of about 200° C. or higher is dispersed in an organic solvent at a concentration of about 5 to 70%, and compressing the fabric with a mangle roller. These steps may be performed using about 20 to 80 parts by weight of the nonwoven fabric, and about 20 to 80 parts by weight of the flame retardant thermosetting resin binder. Furthermore, the flame retardant thermosetting resin binder may act to combine the fiber materials forming a high temperature resistant sound absorbing material and maintaining a substantially consistent shape thereof.

The first solvent recovering step (S113) and second solvent recovering step (S213) may form a first thermosetting felt and a second thermosetting felt by evaporating the organic solvent from the first resin soaked nonwoven fabric and second resin soaked nonwoven fabric formed in the first binder soaking step (S111) and second binder soaking step (S211), resulting in the flame retardant thermosetting resin binder remaining in the nonwoven fabric. These steps may be performed by drying the fabric in a dry oven at a temperature of about 70 to 200° C. for about 1 to 10 min. Furthermore, this process may remove harmful substances generated from the evaporation of the organic solvent during the formation of a high temperature resistant sound absorbing material. In addition, the flame retardant thermosetting resin binder may be composed of epoxy resin, about 1 to 20 wt % of a curing agent based on the weight of epoxy resin, about Ito 10 wt % of a catalyst based on the weight thereof, and about 10 to 40 wt % of a flame retardant based on the weight thereof.

The second binder surface treating step (S215) may form a second resin surface treated felt by treating a surface of the second thermosetting felt formed in the second solvent recovering step (S213) with an organic solvent in which a thermosetting binder resin is dispersed. Furthermore, the surface treatment may be performed using a gravure or a sprayer. In addition, this process may increase surface adhesiveness of the second resin surface treated felt, and may thus improve binding strength at the adhesive surface of a product during the formation of a high temperature resistant sound absorbing material to prevent peeling of a product.

The second solvent recovering step (S217) may form a second resin surface treated thermosetting felt by evaporating the organic solvent from the second resin surface treated felt formed in the second binder surface treating step (S215). This step may be performed by drying the fabric in a dry oven at a temperature of about 70 to 200° C. for about 1 to 10 min and evaporating the organic solvent. Furthermore, this process may remove harmful substances generated from the evaporation of the organic solvent during the formation of a high temperature resistant sound absorbing material.

The thermosetting binder resin may be composed of epoxy resin, about 1 to 20 wt % of a curing agent based on the weight of epoxy resin, and about 1 to 10 wt % of a catalyst based on the weight thereof. The epoxy resin may be composed of one or more resins selected from a group consisting of: a bisphenol A diglycidyl ether, a bisphenol F diglycidyl ether, a polyoxypropylene diglycidyl ether, a phosphazene diglycidyl ether, a phenol novolac epoxy, an o-cresol novolac epoxy, and a bisphenol A-novolac epoxy.

The organic solvent may be composed of one or more solvents selected from a group consisting of: a methyl ethyl ketone (MEK), and a dimethyl carbonate (DMC). The organic solvent may disperse the flame retardant thermosetting resin binder substantially evenly to allow the flame retardant thermosetting resin binder to penetrate into the nonwoven fabric at a predetermined concentration and may substantially evenly disperse the thermosetting binder resin to coat the thermosetting binder resin on the surface of the second thermosetting felt at a predetermined concentration.

The molding step (S401) may include adhering one surface of the first thermosetting felt formed in the first solvent recovering step (S113) to one surface of the second resin surface treated thermosetting felt formed in the second solvent recovering step (S217), and hot compressing the felt at a temperature of about 150 to 230° C. for about 60 to 300 sec under pressure of about 60 to 200 kgf/cm$^2$ Furthermore, this process may harden the flame retardant thermosetting resin binder and thermosetting binder resin, and to maintain a substantially consistent shape of a high temperature resistant sound absorbing material.

Figure 2:
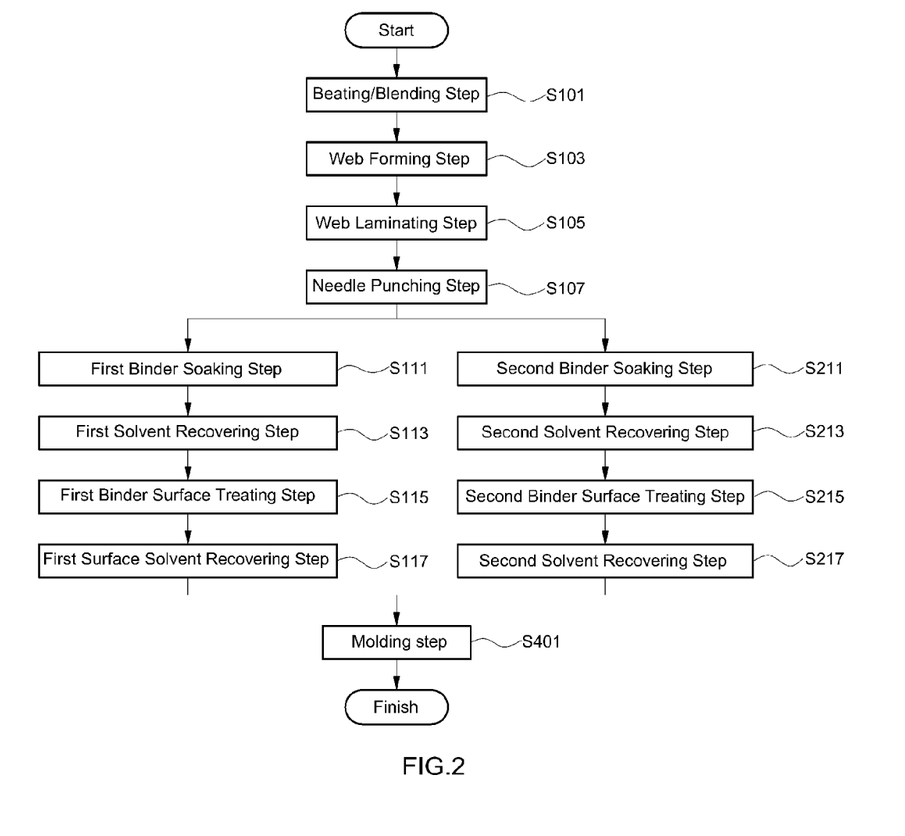

Further, the method of manufacturing a high temperature resistant sound absorbing material for vehicles according to the present invention may further include a first binder surface treating step (S115), a first surface solvent recovering step (S117), and a molding step (S401') after the first solvent recovering step (S113). Since the first hinder surface treating step (S115) and first surface solvent recovering step (S117) are performed according to the same method as described in the second binder surface treating step (S215) and second solvent recovering step (S217), the detailed description thereof is omitted.

Figure 3:
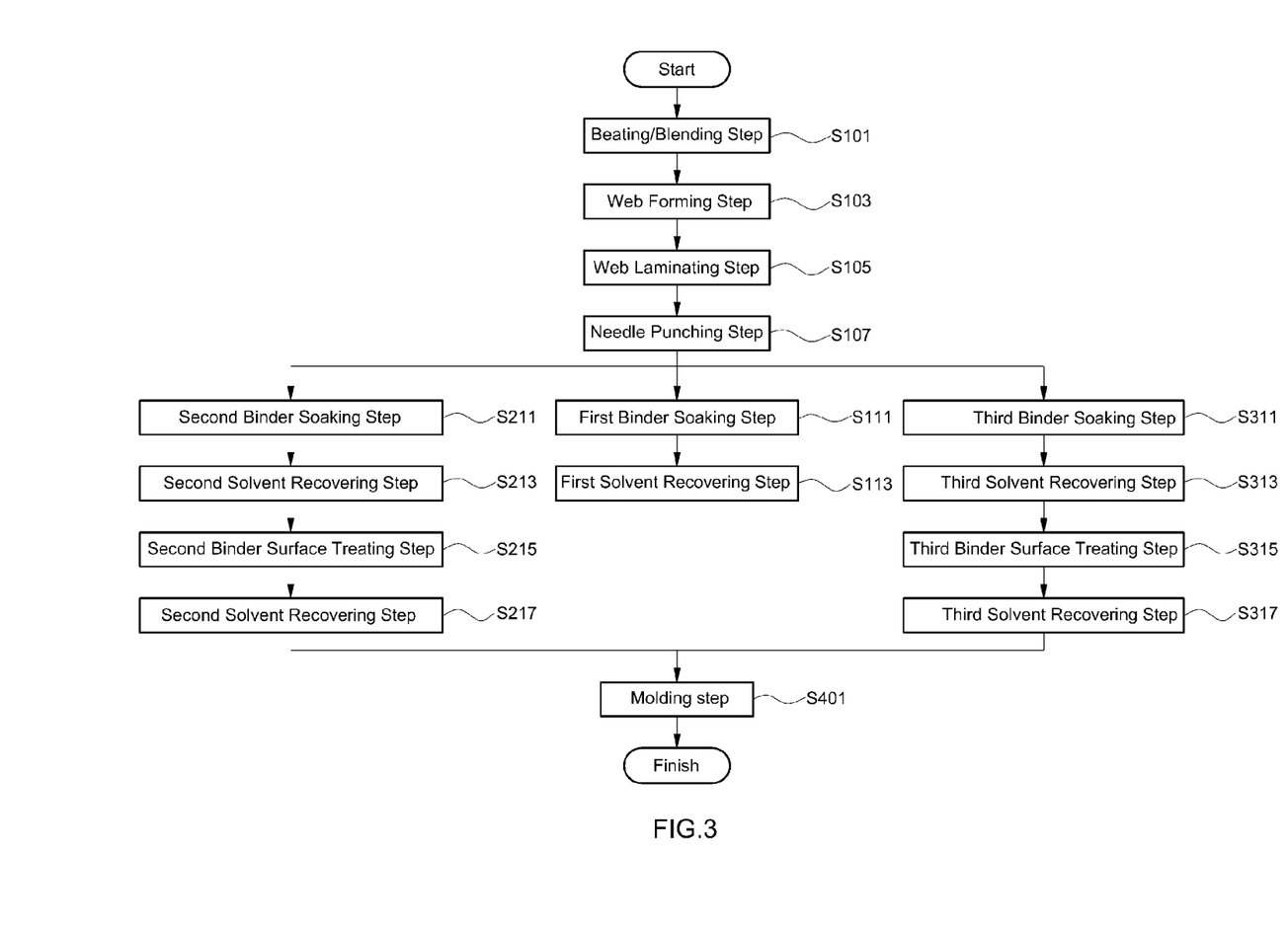
Figure 4:
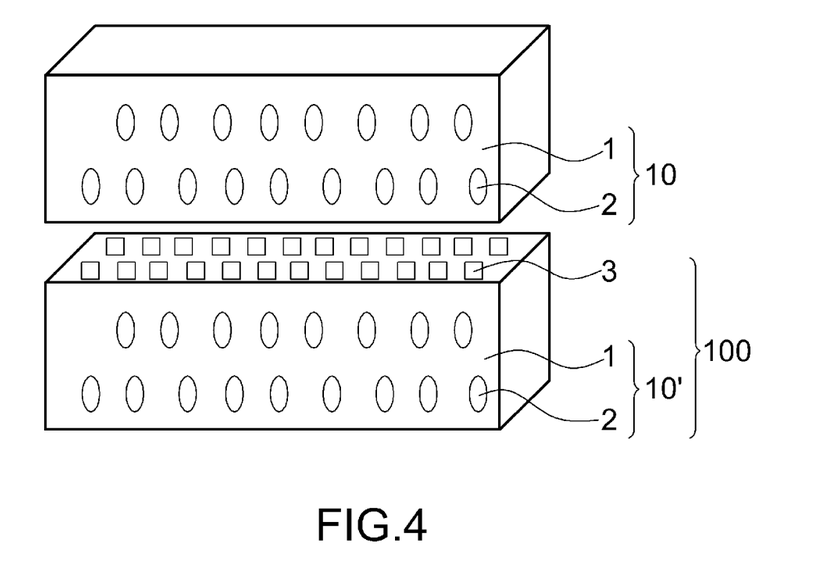
FIGS. 4-6 illustrate the high temperature resistant sound absorbing material for vehicles manufactured by the method according to exemplary embodiments of the present invention.
Figure 5:
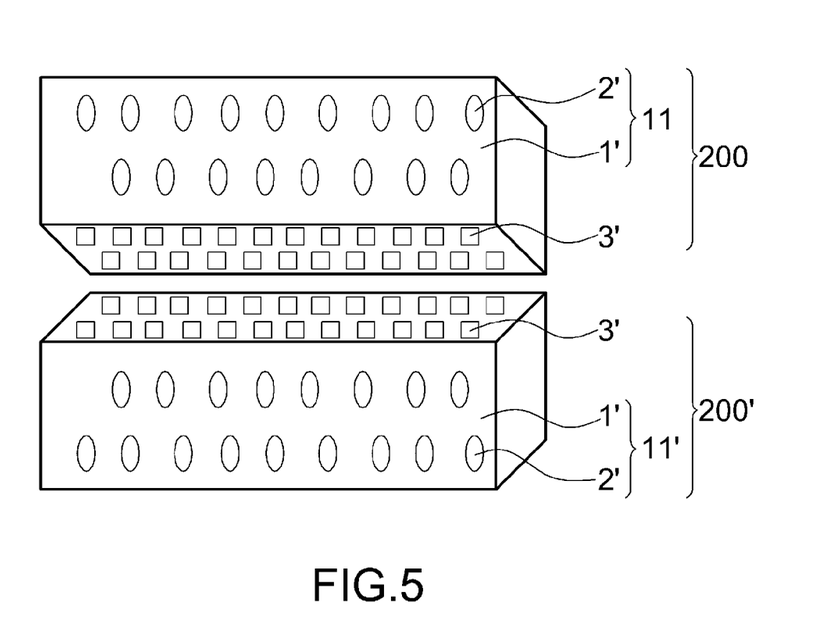
Figure 6:
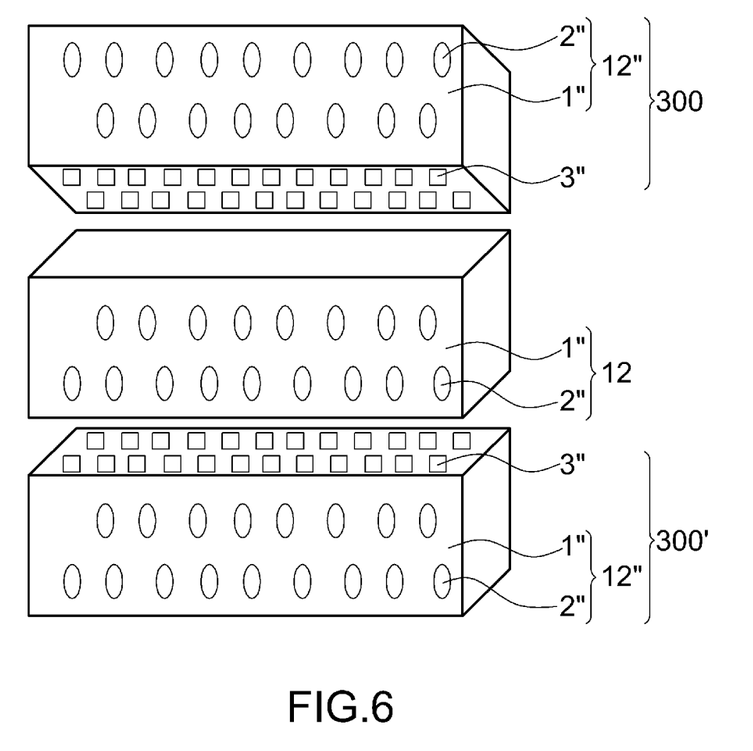
Figure 7:
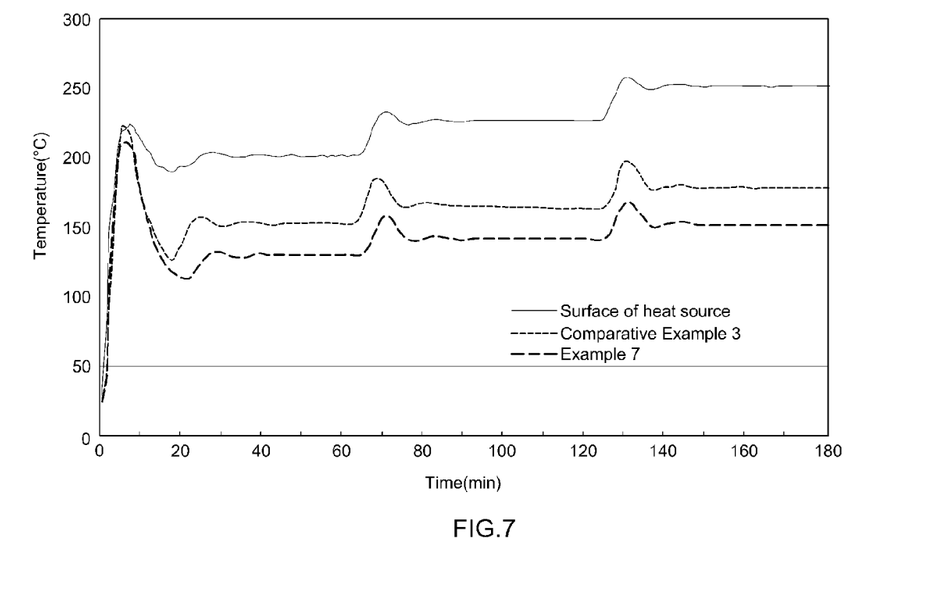
FIG. 7 is an exemplary graph comparing heat shielding properties of the high temperature resistant sound absorbing material for vehicles manufactured by the method according to an embodiment of the present invention and glass wool as a sound absorbing material for a conventional vehicle engine room manufactured by the method according to the Comparative Example of the present invention.

The molding step (S401') may include adhering one surface of the first resin surface treated thermosetting felt formed in the first surface solvent recovering step (S117) to one surface of the second resin surface treated thermosetting felt formed in the second solvent recovering step (S217), and hot compressing the felt at a temperature of about 150 to 230° C. for about 60 to 300 sec under pressure of about 60 to 200 kgf/cm$^2$ In addition, the method of manufacturing a high temperature resistant sound absorbing material for vehicles according to the present invention may further include a third binder soaking step (S311), a third solvent recovering step (S313), a third binder surface treating step (S315), a third surface solvent recovering step (S317), and a molding step (S401") after the nonwoven fabric is formed in the needle punching step (S107).

Since the third binder soaking step (S311), third solvent recovering step (S313), third binder surface treating step (S315), and third surface solvent recovering step (S317), are performed according to the same method as described in the first binder soaking step (S111), second binder soaking step (S211), first solvent recovering step (S113), second solvent recovering step (S213), first binder surface treating step (S115), second binder surface treating step (S215), first surface solvent recovering step (S117), and second solvent recovering step (S217), the detailed description thereof is omitted.

The molding step (S401") may include adhering one surface of the first thermosetting felt formed in the first solvent recovering step (S113) to one surface of the second resin surface treated thermosetting felt formed in the second solvent recovering step (S217), adhering the other surface of the first thermosetting felt to one surface of the third resin surface treated thermosetting felt formed in the third surface solvent recovering step (S317), and hot compressing the felt at a temperature of about 150 to 230° C. for about 60 to 300 sec under pressure of about 60 to 200 kgf/cm$^2$

EXAMPLES

The following examples illustrate exemplary embodiments of the invention and are not intended to limit the same.

Example 1

A meta-aramid fiber (2 de, 76 mm) with a crimp frequency of 6 crimps per cm was beaten by air blowing and formed into 30 g/m$^2$ of a web according to a carding method. The formed webs were overlapped tenfold on a conveyer belt at a production rate of 5 mmin using a horizontal lapper, to form a laminated web. The laminated web was subjected to a first single top punching motion in a perpendicular direction to the surface and a second double bottom punching motion using a needle puncher, to produce 300 g/m$^2$ of a nonwoven fabric having a thickness of 6 mm.

Example 2

To epoxy resin, in which bisphenol A diglycidyl ether, polyoxypropylene diglycidyl ether and phosphazene diglycidyl ether were mixed, 10 wt % of cyanoguanidine as a curing agent based on the weight of epoxy resin, 8 wt % of bis-dimethylurea compounds as a catalyst based on the weight thereof and 30 wt % of melamincyanurate as a flame retardant based on the weight thereof were added and mixed, to prepare a flame retardant thermosetting resin binder.

Example 3

After the flame retardant thermosetting resin binder prepared in Example 2 was dispersed in dimethyl carbonate (DMC) at a concentration of 15% in a bath, the nonwoven fabric prepared in Example 1 was soaked in the bath, and then, 1,300 g/m$^2$ of a resin soaked nonwoven fabric was formed using a mangle roller under pressure of 8 kgf/cm$^2$ The formed resin soaked nonwoven fabric was successively passed through a dry oven at a rate of 5 m/min. In addition, the temperature of the dry oven was set to 100° C. for a first cycle, 120° C. for a second cycle, 150° C. for a third cycle, and 150° C. thr a fourth cycle. As a result, 850 g/m$^2$ of the organic solvent was removed and 150 g/m$^2$ of the flame retardant thermosetting resin binder remained in the material, to obtain a 450 g/m$^2$ of a thermosetting felt.

Example 4

The thermosetting binder resin was prepared according to the same method as described in Example 2 without including 30 wt % of melamincyanurate as a flame retardant based on the weight of epoxy resin.

Example 5

The thermosetting felt (450 g/m²) was prepared according to the same method as described in Example 3After the thermosetting binder resin prepared in Example 4 was dispersed in dimethyl carbonate (DMC) at a concentration of 30% in a bath, the surface of the thermosetting felt was subjected to gravure coating with 100 g/m² of an organic solvent, in which the thermosetting binder resin was dispersed, using a mangle roller while maintaining the pressure of 3 kgf/cm²to form 550 g/m² of a resin surface treated felt. The formed resin surface treated felt was successively passed through a dry oven at a rate of 5 m/min. In addition, the temperature of the dry oven was set to 100° C. for a first cycle, 120° C. for a second cycle, 150° C. for a third cycle, and 150° C. for a fourth cycle. As a result, 70 g/m² of the organic, solvent was removed and 30 g/m² of the thermosetting binder resin remained in the material, to form a 480 g/m² of a resin surface treated thermosetting felt.

Example 6

The surface of 450 g/m² of the thermosetting felt prepared in Example 3 was laminated on the gravure treated surface of 480 g/m² of the resin surface treated thermosetting felt prepared in Example 5and was subjected to hot compression at a temperature of 200° C. for 200 sec under pressure of 100 kgf/cm²to manufacture a high temperature resistant sound absorbing material having a thickness of 2 to 10 mm.

A sound absorbing coefficient of the high temperature resistant sound absorbing material manufactured in Example 6 was measured according to a standard method, ISO R 354 Alpha Cabin testing. Average values of the sound absorbing coefficients measured for three samples are shown in following Table 1

TABLE 1

| Thickness (mm) | Frequency (Hz) | | | |
|---|---|---|---|---|
| | 1,000 | 2,000 | 3,150 | 5,000 |
| 2 | 0.06 | 0.13 | 0.35 | 0.63 |
| 3 | 0.08 | 0.21 | 0.47 | 0.74 |
| 4 | 0.11 | 0.31 | 0.61 | 0.81 |
| 5 | 0.15 | 0.43 | 0.71 | 0.87 |
| 6 | 0.23 | 0.58 | 0.81 | 0.91 |
| 7 | 0.29 | 0.67 | 0.84 | 0.94 |
| 8 | 0.34 | 0.71 | 0.86 | 0.96 |
| 9 | 0.37 | 0.74 | 0.87 | 0.97 |
| 10 | 0.41 | 0.77 | 0.89 | 0.98 |

As shown in Table 1, when the high temperature resistant sound absorbing material manufactured according to the method of the present invention is disposed on a part near the noise source of an engine and an exhaust system, engine noise radiated from the engine and exhaust system is reduced.

Example 7

The high temperature resistant sound absorbing material was manufactured according to the same method as described in Example 6 using an engine cylinder block.

Comparative Example 1

After the webs were laminated in twenty folds by overlapping according to the same method as described in Example 1, the laminated web was subjected to needle punching in a first single top punching motion, followed by in a second double bottom punching motion, to prepare 600 g/m² of a nonwoven fabric having a thickness of 12 mm. In a bath, the flame retardant thermosetting resin binder prepared in Example 2 was dispersed at a concentration of 15% in dimethyl carbonate (DMC), the nonwoven fabric was soaked in the bath, and then a resin soaked nonwoven fabric was formed using a mangle roller while maintaining the pressure of 8 kgf/cm². The organic solvent was removed from the resin soaked nonwoven fabric using a dry oven, to prepare a thermosetting felt. Furthermore, a high temperature resistant sound absorbing material was manufactured according to the same method as described in Example 7.

Comparative Example 2

After 300 g/m² of a nonwoven fabric was prepared according to the same method as described in Example 1, the prepared two nonwoven fabrics were combined by needle punching, to manufacture 600 g/m² of a nonwoven fabric having a thickness of 12 mm. Furthermore, a thermosetting felt was prepared using the nonwoven fabric according to the same method as described in Comparative Example 1, followed by manufacturing a high temperature resistant sound absorbing material according to the same method as described in Example 7.

Comparative Example 3

Figure 8:
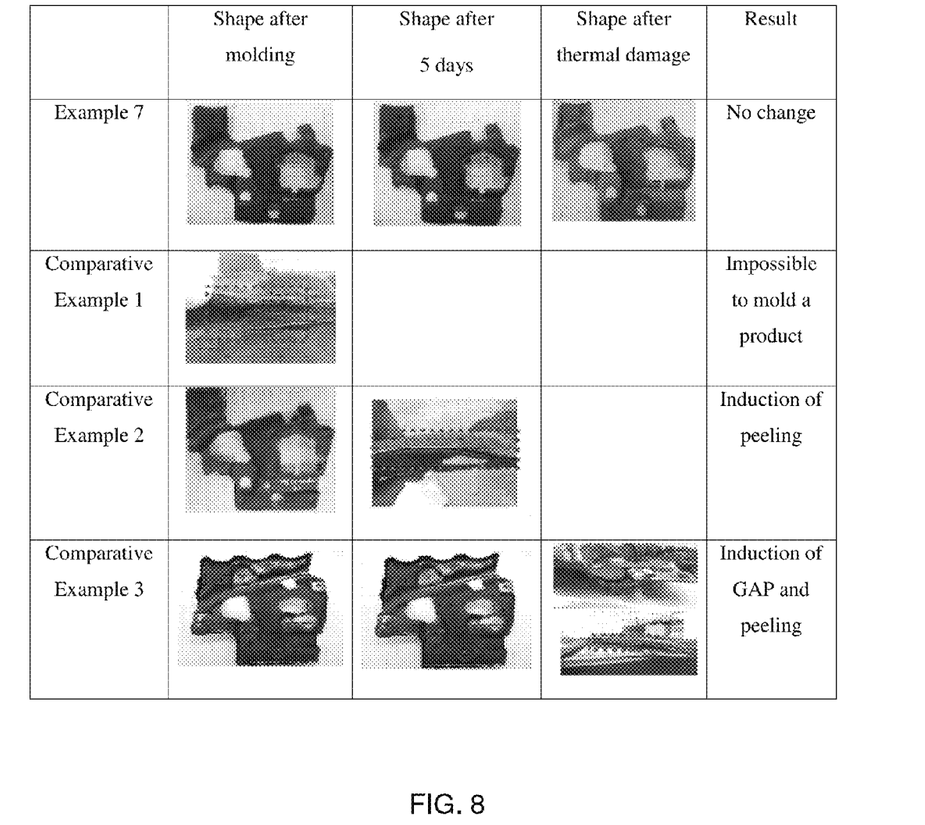
FIG. 8 is a table showing comparative examples in relation to the exemplary embodiment of the present invention.

Glass wool (950 g/m²), which has been used as a sound absorbing material for a conventional vehicle engine room, was made into a sound absorbing material for vehicles by using an engine cylinder block mold, combining the glass wool with an anti-vibration steel sheet having a thickness of 1.6 mm using bolts and nuts, to manufacture a high temperature resistant sound absorbing material for vehicles The manufactured high temperature resistant sound absorbing materials for vehicles in Example 7 and Comparative Examples 1 to 3 were subjected to morphology analysis for observing the change in morphology before the molding and 5 days after the molding and thermal damage assessment under conditions of exposure to a temperature of 250° C. for 200 hours using a thermal resistant chamber, and the results obtained therefrom are shown in FIG. 8.

As shown in FIG. 8, when the high temperature resistant sound absorbing material is surface treated with the thermosetting binder resin and laminated on one surface of the thermosetting felt, it may satisfy the requirement for thickness with a minimum weight gain, no deformation of a product were observed after molding, and the function of the material remained consistent after heat damage assessment. Thus, the high temperature resistant sound absorbing material of the present invention may be installed on a part near an engine noise source.

However, when directly manufacturing the nonwoven fabric without surface treatment with the thermosetting binder resin (Comparative Example 1), a molding process could not be performed, leading to an increase in the weight of the nonwoven fabric to satisfy the thickness requirement. Further, when decreasing the thickness, performance of the material decreased. Moreover, when combining the nonwoven fabrics (Comparative Example 2), the risk of developing surface peeling at the combined site of the nonwoven fabrics due to the secondary hardening of the flame retardant thermosetting resin binder increases, thereby causing a loss of function as an automobile part.

In addition, Table 2 shows the temperature measurement of increasing the temperature of heat source orientation up to 250° C. by heating the high temperature resistant sound absorbing materials for vehicles manufactured in Example 7 and Comparative Example 3

TABLE 2

|  |  | Time (min) | | | | | | |
| --- | --- | --- | --- | --- | --- | --- | --- | --- |
|  |  | 0 | 30 | 60 | 90 | 120 | 150 | 180 |
| Surface of heat source | ° C. | 30 | 203 | 201 | 226 | 227 | 251 | 252 |
| Example 7 |  | 25 | 131 | 130 | 141 | 142 | 152 | 152 |
| Comparative Example 3 |  | 25 | 151 | 152 | 165 | 164 | 178 | 179 |

As shown in Table 2, when the high temperature resistant sound absorbing material for vehicles according to the present invention exhibits a superior heat shielding effect to the conventional sound absorbing material for an automobile engine room, leading to the protection of plastic and rubber parts.

To evaluate equipment performance of the high temperature resistant sound absorbing material for vehicles manufactured in Example 7, the $3^{rd}$ gear W.O.T PG assessment was performed on a diesel vehicle (U2 1.7), and the results are shown in Table 3. Further, the results of measuring vehicle interior noise in the idle neutral gear are shown in Table 4.

TABLE 3

|  | Weight of a | $3^{rd}$ gear W.O.T 2,000~4,000 RPM AI (%) AVERAGE | |
| --- | --- | --- | --- |
|  | product (g) | Front seat | Back seat |
| No equipment | 0 | 80 | 76 |
| Equipment | 66 | 82 | 79.8 |

TABLE 4

|  | Weight of a | N gear IDLE 400~6,300 Hz dB(A) RMS | |
| --- | --- | --- | --- |
|  | product (g) | Front seat | Back seat |
| No equipment | 0 | 39 | 36.2 |
| Equipment | 66 | 37.8 | 35.3 |

As shown in Tables 4 and 5, when applying the high temperature resistant sound absorbing material according to the present invention to vehicles, booming noise is improved by 2~3.8% based on the increase in weight of 66 g, and interior noise is reduced by 0.9~1.2 dB(A).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a high temperature resistant sound absorbing material for vehicles, comprising:
   beating and blending a fiber material;
   forming a plurality of webs in thin sheets using the beaten and blended fiber material;
   overlapping the plurality of webs to form a plurality of laminated webs;
   interconnecting the plurality of laminated webs via a needle motion to form a nonwoven fabric;
   executing a first treatment phase to obtain a first resin surface treated thermosetting felt, the first treatment phase including: soaking the nonwoven fabric in an organic solvent in which a flame retardant thermosetting resin binder is dispersed to form a first resin soaked nonwoven fabric; and forming a first thermosetting felt, wherein the flame retardant thermosetting resin binder remains uncured in the first resin soaked nonwoven fabric;
   executing a second treatment phase to obtain a second resin surface treated thermosetting felt, the second treatment phase including: soaking the nonwoven fabric in the organic solvent in which the flame retardant thermosetting resin binder is dispersed to form a second resin soaked nonwoven fabric; forming a second thermosetting felt, wherein the flame retardant thermosetting resin binder remains uncured in the second resin soaked nonwoven fabric; treating one surface of the second thermosetting felt with the organic solvent in which the thermosetting binder resin is dispersed to form a second resin surface treated felt; and forming a second resin surface thermosetting felt, wherein the thermosetting binder remains uncured in the second resin surface treated felt; and
   adhering, by hardening the flame retardant thermosetting resin binder and the thermosetting resin binder, one surface of the first resin surface treated thermosetting felt to one surface of the second resin surface treated thermosetting felt and molding the high temperature resistant sound absorbing material into a three-dimensional shape,
   wherein the beating and blending of a fiber material comprises beating the fiber material having about 1 to 10 crimps per centimeter, a diameter of about 1 to 33 µm and a length of about 20 to 100 mm, and blending one or more fibers having about 1 to 10 crimps per centimeter, a diameter of about 1 to 33 µm and a length of about 20 to 100 mm,
   wherein the flame retardant thermosetting resin binder is dispersed in the organic solvent at a concentration of about 15 to 30%,
   wherein the thermosetting binder resin is dispersed with a gravure or a sprayer.

2. The method according to claim 1, wherein the fiber material has a limiting oxygen index (LOI) of about 25% or higher and a heat resistant temperature of about 200° C. or higher.

3. The method according to claim 1, wherein the fiber material is one or more materials selected from a group consisting of: a m-Aramid fiber, p-Aramid fiber, a poly (phenylene sulfide) (PPS) fiber, an acrylic hydrocarbon (preoxidized PAN) fiber, a polyimide (PI) fiber, a polybenzimidazole (PBI) fiber, a polybenzoxazole (PBO) fiber, a polytetrafluoroethylene (PTFE) fiber, a metal fiber, a carbon fiber, a glass fiber, a basalt fiber, a silica fiber, and a ceramic fiber.

4. The method according to claim 1, wherein forming a plurality of webs further includes a carding method.

5. The method according to claim 1, wherein overlapping the plurality of webs is performed at a production rate of about 10 m/min or slower using a horizontal lapper.

6. The method according to claim 1, wherein the needle motion is a punching motion selected from one or more of a group consisting of: a single bottom punching motion, a single top punching motion, a double bottom punching motion, and a double top punching motion.

7. The method according to claim 1, wherein the flame retardant thermosetting resin binder has a heat resistant temperature of about 200° C. or higher.

8. The method according to claim 7, wherein soaking the nonwoven fabric is performed using about 20 to 80 parts by weight of the nonwoven fabric and about 20 to 80 parts by weight of the flame retardant thermosetting resin binder.

9. The method according to claim 7, wherein the flame retardant thermosetting resin binder is composed of epoxy resin, about 1 to 20 wt % of a curing agent based on the weight of epoxy resin, about 1 to 10 wt % of a catalyst based on the weight thereof, and about 10 to 40 wt % of a flame retardant based on the weight thereof.

10. The method according to claim 9, wherein the epoxy resin is composed of one or more resins selected from a group consisting of: a bisphenol A diglycidyl ether, a bisphenol F diglycidyl ether, a polyoxypropylene diglycidyl ether, a phosphazene diglycidyl ether, a phenol novolac epoxy, an o-cresol novolac epoxy, and a bisphenol A-novolac epoxy.

11. The method according to claim 7, wherein the organic solvent is composed of one or more solvents selected from the group consisting of: a methyl ethyl ketone (MEK), and a dimethyl carbonate (DMC).

12. The method according to claim 1, wherein forming the first and the second thermosetting felt further comprises:
drying the nonwoven fabric in a dry oven at a temperature of about 70 to 200° C. for about 1 to 10 min; and
evaporating the organic solvent.

13. The method according to claim 1, wherein the thermosetting binder resin is composed of epoxy resin, about 1 to 20 wt % of a curing agent based on the weight of epoxy resin, and about 1 to 10 wt % of a catalyst based on the weight thereof.

14. The method according to claim 1, wherein forming the first and the second resin surface treated thermosetting felt, further comprises:
drying the nonwoven fabric in a dry oven at a temperature of about 70 to 200° C. for about 1 to 10 min, and
evaporating the organic solvent.

15. The method according to claim 1, wherein adhering one surface of the first resin surface treated thermosetting felt to one surface of the second resin surface treated thermosetting felt, further comprising:
hot compressing the adhered surfaces at a temperature of about 150 to 230° C. for about 60 to 300 sec under pressure of about 60 to 200 kgf/cm$^2$.

16. A method for manufacturing a high temperature resistant sound absorbing material for vehicles, comprising:
beating and blending a fiber material;
forming a plurality of webs in thin sheets using the beaten and blended fiber material;
overlapping the plurality of webs to form a plurality of laminated webs;
interconnecting the plurality of laminated webs by a needle motion to form a nonwoven fabric;
executing a first treatment phase to obtain a first resin surface treated thermosetting felt, the first treatment phase including: soaking the nonwoven fabric in an organic solvent in which a flame retardant thermosetting resin binder is dispersed to form a first resin soaked nonwoven fabric; forming a first thermosetting felt, wherein the flame retardant thermosetting resin binder remains uncured in the first resin soaked nonwoven fabric; treating a surface of the first thermosetting felt with the organic solvent in which the thermosetting binder resin is dispersed to form a first resin surface treated felt; and forming a first resin surface treated thermosetting felt, wherein the thermosetting binder resin remains uncured in the first resin surface treated felt;
executing a second treatment phase to obtain a second resin surface treated thermosetting felt, the second treatment phase including: soaking the nonwoven fabric in the organic solvent in which the flame retardant thermosetting resin binder is dispersed to form a second resin soaked nonwoven fabric; forming a second thermosetting felt, wherein the flame retardant thermosetting resin binder remains uncured in the second resin soaked nonwoven fabric; treating one surface of the second thermosetting felt with the organic solvent in which the thermosetting binder resin is dispersed to form a second resin surface treated felt; and forming a second resin surface treated thermosetting felt, wherein the thermosetting binder remains uncured in the second resin surface treated felt; and
adhering, by hardening the flame retardant thermosetting resin binder and the thermosetting resin binder, a surface of the first resin surface treated thermosetting felt to a surface of the second resin surface treated thermosetting felt and molding the high temperature resistant sound absorbing material into a three-dimensional shape,
wherein the beating and blending of a fiber material comprises beating the fiber material having about 1 to 10 crimps per centimeter, a diameter of about 1 to 33 μm and a length of about 20 to 100 mm, and blending one or more fibers having about 1 to 10 crimps per centimeter, a diameter of about 1 to 33 μm and a length of about 20 to 100 mm,
wherein the flame retardant thermosetting resin binder is dispersed in the organic solvent at a concentration of about 15 to 30%,
wherein the thermosetting binder resin is dispersed with a gravure or a sprayer.

17. A method for manufacturing a high temperature resistant sound absorbing material for vehicles, comprising:
beating and blending a fiber material;
forming a plurality of webs in thin sheets using the beaten and blended fiber material;
overlapping the plurality of webs to form a plurality of laminated webs;
interconnecting the plurality of laminated webs by a needle motion to form a nonwoven fabric;
executing a first treatment phase to obtain a first resin surface treated thermosetting felt, the first phase treatment including: soaking the nonwoven fabric in an organic solvent in which a flame retardant thermosetting resin binder is dispersed to form a first resin soaked nonwoven fabric; and forming a first thermosetting felt, wherein the flame retardant thermosetting resin binder remains uncured in the first resin soaked nonwoven fabric;
executing a second treatment phase to obtain a second resin surface treated thermosetting felt, the second phase treatment including: soaking the nonwoven fabric in the organic solvent in which the flame retardant thermosetting resin binder is dispersed to form a second resin soaked nonwoven fabric; forming a second thermosetting felt, wherein the flame retardant thermosetting resin binder remains uncured in the second resin soaked nonwoven fabric; treating one surface of the second thermosetting felt with the organic solvent in which the thermosetting binder resin is dispersed to form a second resin surface treated felt; and forming a second resin surface treated thermosetting felt, wherein the thermosetting binder remains uncured in the second resin surface treated felt;

executing a third treatment phase, the third phase treatment including: soaking the nonwoven fabric in the organic solvent in which the flame retardant thermosetting resin binder is dispersed to form a third resin soaked nonwoven fabric; forming a third thermosetting felt, wherein the flame retardant thermosetting resin binder remains uncured in the third resin soaked nonwoven fabric; treating a surface of the third thermosetting felt with the organic solvent in which the thermosetting binder resin is dispersed to form a third resin surface treated felt; and forming a third surface treatment thermosetting felt, wherein the thermosetting binder resin remains uncured in the third resin surface treated felt;

adhering, by hardening the flame retardant thermosetting resin binder and the thermosetting resin binder, a surface of the first resin surface treatment thermosetting felt to a surface of the second resin surface treatment thermosetting fell; and adhering, by hardening the flame retardant thermosetting resin binder and the thermosetting resin binder, the other surface of the first thermosetting felt to a surface of the third resin surface treatment thermosetting felt and molding the high temperature resistant sound absorbing material into a three-dimensional shape, wherein the beating and blending of a fiber material comprises beating the fiber material having about 1 to 10 crimps per centimeter, a diameter of about 1 to 33 μm and a length of about 20 to 100 mm, and blending one or more fibers having about 1 to 10 crimps per centimeter, a diameter of about 1 to 33 μm and a length of about 20 to 100 mm, wherein the flame retardant thermosetting resin binder is dispersed in the organic solvent at a concentration of about 15 to 30%, wherein the thermosetting binder resin is dispersed with a gravure or a sprayer.

18. The method according to claim 17, wherein adhering the other surface of the first thermosetting felt to a surface of the third resin surface treatment thermosetting felt, further comprises:

hot compressing the adhered surfaces at a temperature of about 150 to 230°C. for about 60 to 300 sec under pressure of about 60 to 200 kgf/cm$^2$.

* * * * *